United States Patent

Kasuga et al.

[11] Patent Number: 5,517,362
[45] Date of Patent: May 14, 1996

[54] OPTICAL PICKUP DEVICE

[75] Inventors: Ikuo Kasuga; Tatuki Wade; Akira Miyamae, all of Komagane, Japan

[73] Assignee: Sankyo Seiki Mfg. Co., Ltd., Nagano, Japan

[21] Appl. No.: 230,105

[22] Filed: Apr. 20, 1994

[30] Foreign Application Priority Data

Apr. 22, 1993 [JP] Japan .................. 5-026440 U
May 20, 1993 [JP] Japan .................. 5-031664 U
May 24, 1993 [JP] Japan .................. 5-032281 U

[51] Int. Cl.6 .................................. G02B 7/02
[52] U.S. Cl. ............ 359/811; 359/813; 369/44.14
[58] Field of Search ................... 359/811, 813, 359/823; 369/44.14, 44.11, 44.12, 44.22; 362/255, 226; 16/225

[56] References Cited

U.S. PATENT DOCUMENTS

| | | | |
|---|---|---|---|
| 4,402,110 | 9/1983 | Savage, Jr. ........................ | 16/225 |
| 4,471,414 | 9/1984 | Savage, Jr. ........................ | 362/226 |
| 4,727,648 | 3/1988 | Savage, Jr. ........................ | 362/226 |
| 5,068,771 | 11/1991 | Savage, Jr. ........................ | 362/255 |
| 5,220,543 | 6/1993 | Kuroda et al. .................... | 369/44.14 |
| 5,265,079 | 11/1993 | Getreuer et al. .................. | 369/44.14 |

*Primary Examiner*—Loha Ben
*Attorney, Agent, or Firm*—McAulay Fisher Nissen Goldberg & Kiel

[57] ABSTRACT

An optical pickup device operates to irradiate a disk with an optical beam from a light source by an objective lens and to detect the beam reflected from the disk by a light receiving element. A frame is provided for said device having an optical element fixed therein. The frame is formed with a press-fit hole into which the light source is press-fit and fixed so as to adjust the press-fit depth, thereby adjusting alignment between the optical pickup device and the disk.

8 Claims, 6 Drawing Sheets

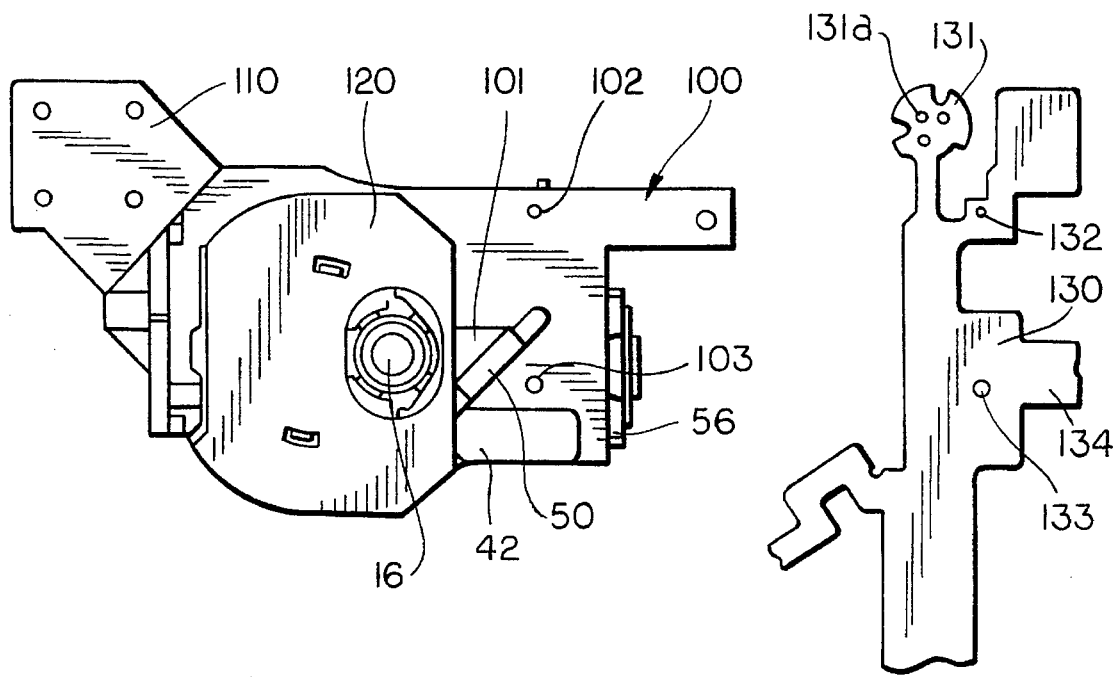
FIG. 12A
FIG. 12B
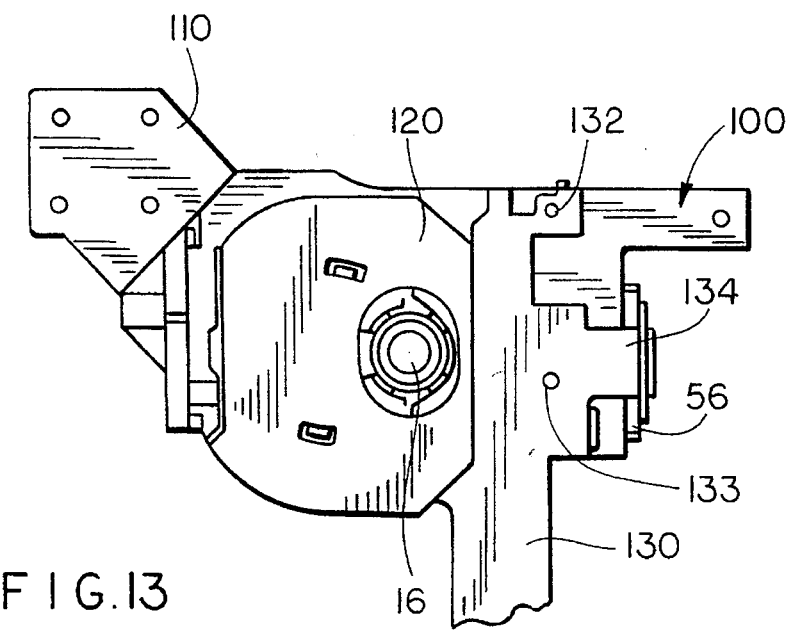
FIG. 13

OPTICAL PICKUP DEVICE

BACKGROUND OF THE INVENTION

1. Field of the Invention

The present invention relates to an optical pickup device and, more particularly, to a mechanism for adjusting the position of a light source.

2. Description of the Related Art

In an optical pickup device to be used for picking up Signals from an optical disk or the like, the adjustment between a light source and a light receiving element is necessary for aligning the zero-cross point of focus detecting characteristics and the focal plane of the disk to be irradiated with an optical beam. The following methods are examples of such adjustment:

1. For the adjustment, a lens is moved in the directions of optical axes at the light receiving side;

2. For the adjustment, the light receiving element is moved in the X, Y and Z directions; and 3. For the adjustment, the light source is fixed on a holder and moved back and forth (as disclosed in Japanese Utility Model Kokai No. 40620/1991).

Any of the optical pickup devices listed above has a large number of parts and a complicated structure for the adjustment so that size reduction will be costly. Because of the complicated structure for the adjustment, moreover, the alignment between the zero-cross point for the focus detection and the focal plane of the disk to be illuminated with the optical beam is liable to be disturbed even after it was made. If the lens or the light receiving element is moved at the light receiving side for the adjustment, backlash becomes involved in an adjusting mechanism or the like with the resultant difficulty that the time for making the adjustment is prolonged or that the accuracy is deteriorated.

OBJECT AND SUMMARY OF THE INVENTION

The present invention has been conceived in an effort to solve the problems specified above and has, as a primary object, the provision of an optical pickup device which can highly accurately adjust the alignment between the zero-cross point and the focal plane of the disk.

In accordance with the invention, in an optical pickup device for irradiating a disk with an optical beam from a light source by an objective lens and for detecting the beam reflected from the disk by a light receiving element, the improvement comprising a frame having an optical element fixed therein. The frame is formed with a press-fit hole into which the light source is press-fit and fixed so as to adjust the press-fit depth, thereby adjusting alignment between the optical pickup device and the disk.

For a better understanding of the present invention, reference is made to the following description and accompanying drawings while the scope of the invention will be pointed out in the appended claims.

BRIEF DESCRIPTION OF THE DRAWINGS

FIG. 12(a) illustrates a top plan view showing an optical pickup device according to the present invention and FIG. 12(b) illustrates a power supply flexible board to be used in the optical pickup device;

FIG. 13 is a top plan view showing the state in which the flexible board is mounted on the optical element block of the optical pickup device;

DESCRIPTION OF THE PREFERRED EMBODIMENTS

Figure 1:
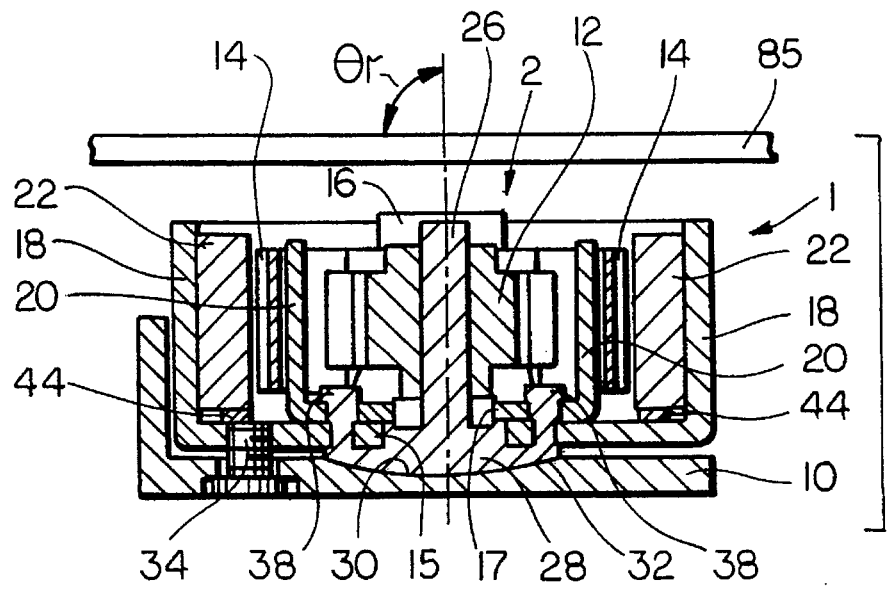
FIG. 1 is a sectional side elevation showing an embodiment of the optical pickup device according to the present invention.
Figure 2:
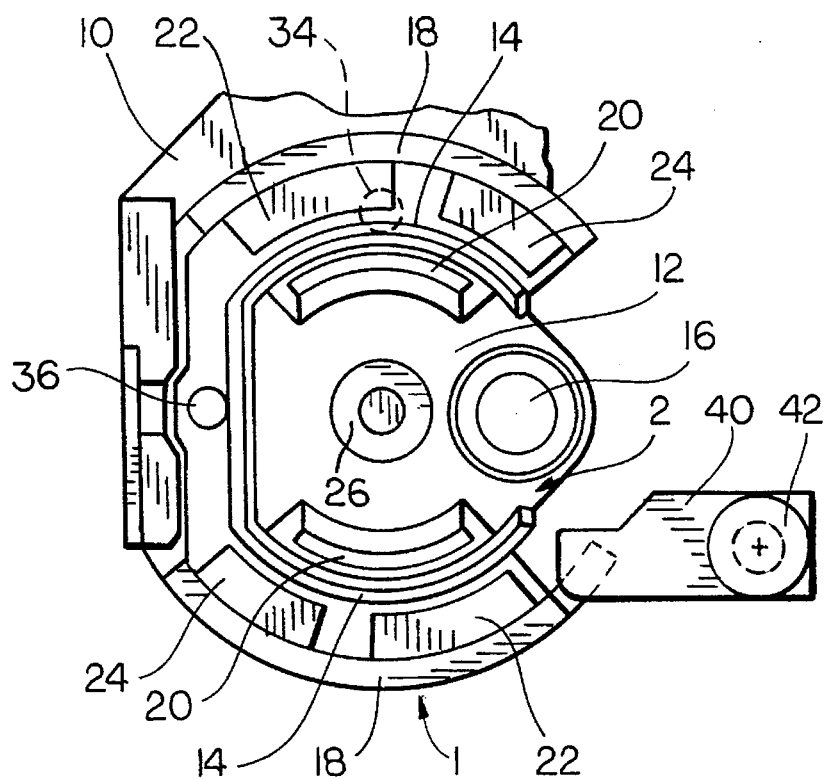
FIG. 2 is a top plan view of the optical pickup device of FIG. 1.
Figure 3:
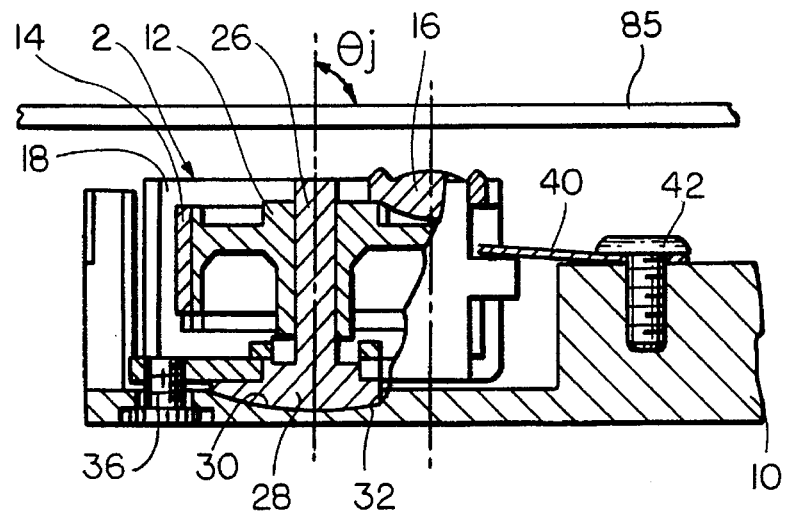
FIG. 3 is a sectional front elevation showing the optical pickup device of FIG. 1.

On a frame 10 integrally molded of a resin, as shown in FIGS. 1 to 3, there is mounted a stationary unit 1. An outer yoke plate 19 and an inner plate 20 are integrally jointed to the stationary unit by a resin, and a support shaft 26 is integrally formed with the stationary unit by a resin. A movable unit 2 is supported by that support shaft 26.

Figure 4:
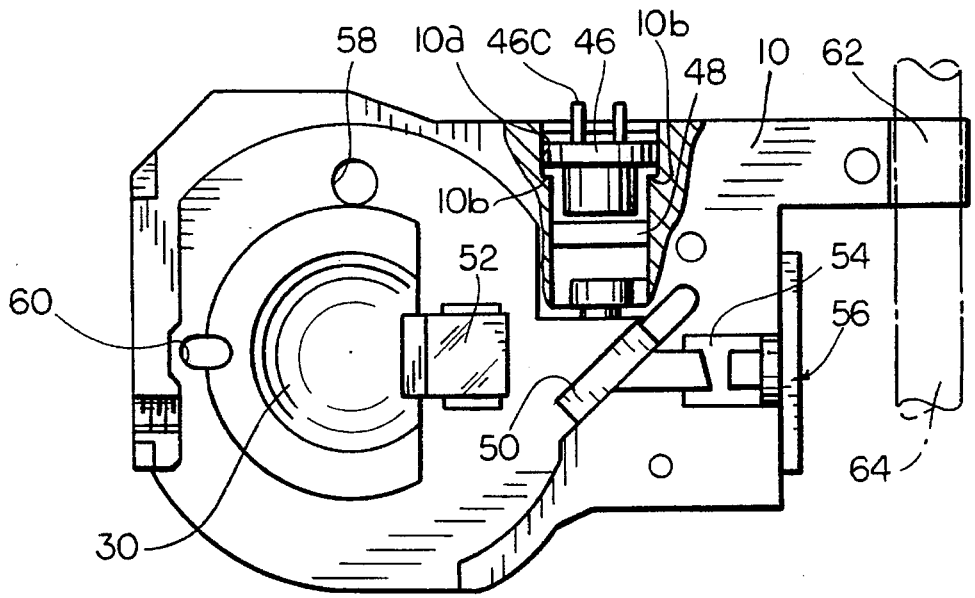
FIG. 4 is a top plan view showing a frame of the embodiment.
Figure 5:
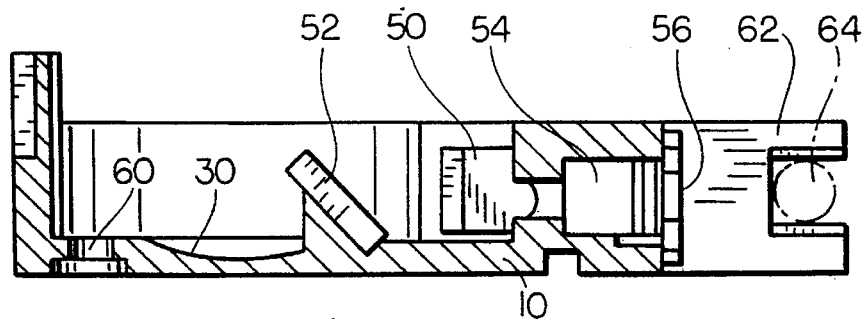
FIG. 5 is a sectional front elevation showing the same frame referred to in FIG. 4.

Referring to FIGS. 4 and 5, a press-fit hole 10a is formed in the frame 10 at a central portion in its longitudinal one-side edge. In the press-fit hole 10a, there is press-fit a light source 46 comprising a semiconductor laser or the like, and there is also arranged a diffraction grating 48 which is located on the path of a laser beam emanating from the light source 46. On the path of the beam having passed through the diffraction grating 48, there is arranged a beam splitter 50 for reflecting the laser beam sideways (i.e., to the left, as viewed in FIGS. 4 and 5). On the path of the laser beam reflected by the beam splitter 50, there is arranged a mirror 52 for reflecting the laser beam upward to guide it into the later-described objective lens and optical disk. On the path of the laser beam reflected by the optical disk, reversed by the objective lens and the mirror 52 and transmitted through the beam splitter 50, there is arranged a sensor lens 54 acting as an optical wedge, at the back of which (as located at the righthand side of FIGS. 4 and 5) is arranged a light receiving element 56. The frame 10 is formed in its inner bottom, as located at the lefthand side of FIGS. 4 and 5, with a recess 30 forming a portion of a sphere. Outside of this recess 30, there are formed holes 58 and 60 which are arranged at 90 degrees with respect to the center of the recess 30. The frame 10 is formed at its righthand end portion of the drawing with a forked guide portion 62 which grasps a guide shaft 64 so that the frame 10 is held to move up and down, as viewed in FIG. 4, along the guide shaft 64, that is, radially of the optical disk.

To the inner faces of the paired partially cylindrical walls of the outer yoke plate 18, respectively, a focusing drive magnet 22 and a tracking drive magnet 24 are adhered and fixed. These individual drive magnets 22 and 24 are positioned in the direction of the support shaft 26 by holding them in abutment against the upper face of a jetty 44. The stationary unit 1 is so constructed.

This stationary unit 1 has its base portion 28 formed with an adjusting face 32 forming a portion of a sphere. This adjusting face 32 is received by the spherical recess 30 of the aforementioned frame 10. Into the aforementioned two holes 58 and 60 of the frame 10, there are inserted inclination adjusting screws 34 and 36, which are fastened in the aforementioned screw holes of the outer yoke plate 18. On the frame 10, one end portion of a leaf spring 40 is fixed by a mounting screw 42, the spring pushes the remotest position of the outer plate 18 from the aforementioned screw hole across the support shaft 26. By fastening or loosening the inclination adjusting screws 34 and 36, therefore, the aforementioned adjusting face 32 turns on the center of its sphere, while sliding on the aforementioned recess 30, by or against the elasticity of the leaf spring 40, so that the angle of inclination of the aforementioned stationary unit 1 changes. The angle $\theta_r$ of inclination, as taken in one direction of the support shaft 26, can be adjusted by the adjusting screw 34, as shown in FIG. 1. As shown in FIG. 3, on the other hand, the angle $\theta_j$ of inclination, as taken at a right angle with respect to the aforementioned inclination angle $\theta r$, can be adjusted by the adjusting screw 36 which is offset at the angle of 90 degrees from the adjusting screw 34 with respect to the support shaft 26. In these ways, the angles of inclination of the support shaft 26 with respect to the frame 10 can be finely adjusted.

The aforementioned movable unit 2 is mounted on the support shaft 26 so that it can move along and rotate around the support shaft 26. The movable unit 2 is equipped with a holder 12 which is fitted on the outer circumference of the support shaft 26 so that it can move along and rotate around the support shaft 26. An objective lens 16 has its holding frame integrated with that holder 12, on which is fixed a drive coil 14. The objective lens 16 is disposed on the optical path of the laser beam reflected by the mirror 51, which has been described with reference to FIGS. 4 and 5, so as to focus the laser beam on the recording bits of an optical disk 85 and to guide the reflected beam from the optical disk 85 onto the aforementioned mirror 52. The aforementioned drive coil 14 is a sheet-shaped coil, in which a plurality of spiral pattern coils are sandwiched by insulators and which is molded generally into the shape of a letter "C" and fixed on the outer circumference of the holder 12. The drive coil 14 can naturally be made by molding the wound coils known in the prior art into a similar construction. The aforementioned pattern coils are composed of the focusing drive coil and the tracking drive coil, the former of which is arranged to face the focusing drive magnet 22 whereas the latter is arranged to face the tracking drive magnet 24.

In FIG. 4, the press-fit hole 10a is formed therein with a stepped portion 10b. The light source 46 is press-fit therein. Across this stepped portion 10b, the press-fit hole 10a is given a larger diameter at the side of the light source 46 and a smaller diameter at the side of the diffraction grating 48. The light source 46 is formed at its root with a flanged portion 46a, which is given an external size having a predetermined dimensional tolerance with respect to the external size of the larger-diameter portion of the press-fit hole 10a. Because of this dimensional tolerance, the light source 46 can be moved within the press-fit hole 10a by the press-fitting force of a predetermined low range. When the light source 46 moves in the press-fit hole 10a, moreover, the stepped portion 10b formed in the press-fit hole 10a plays the roll of a stopper while being in abutment against the flanged portion 46a of the light source 46, thereby restricting the movement of the light source 46 during the adjustment.

The depth of press-fit of the light source is required to have the following accuracy S (with respect to the light emitting position) so as to ensure alignment with the zero-cross for locating the focal point, as described above. If the objective lens is assumed to have a focal depth of 1 μm, the following relation should hold for a light source side magnification of M1, a light receiving side magnification of M2 and a disk side magnification of M3, so that the residual error E shown in FIG. 11 may be confined within that value of 1 μm:

$$S \geq (M1 \times M2)/(2 \times M3^2).$$

Figure 11:
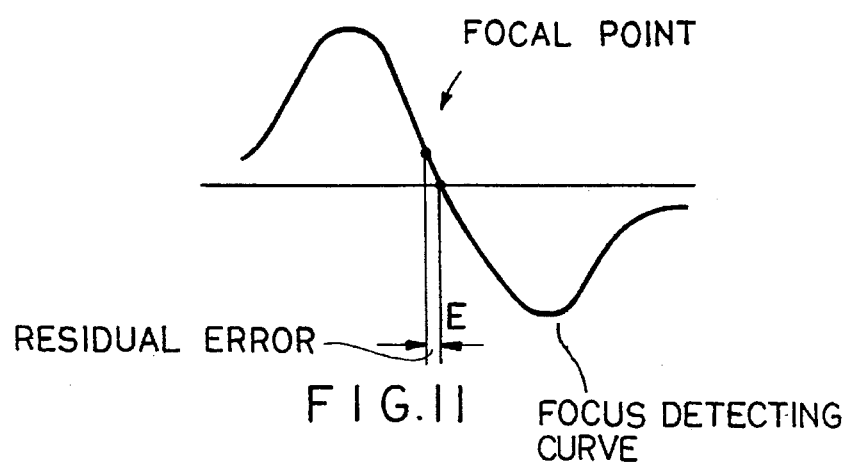
FIG. 11 is a graph plotting a focus detecting curve and a residual error from the abscissa crossing which represents the exact focal point according to the present invention.

It should be understood that the residual error E shown in FIG. 11 represents the distance along the abscissa between the exact focal point which occurs when the curve crosses the abscissa and the actual focal point.

For a general example of a CD pickup, the required press-fitting accuracy S has to be determined for M1=5.5, M2=10 and M3=1 from the relation, as follows:

$$S \geq 27.5 \ \mu m.$$

Figure 8:
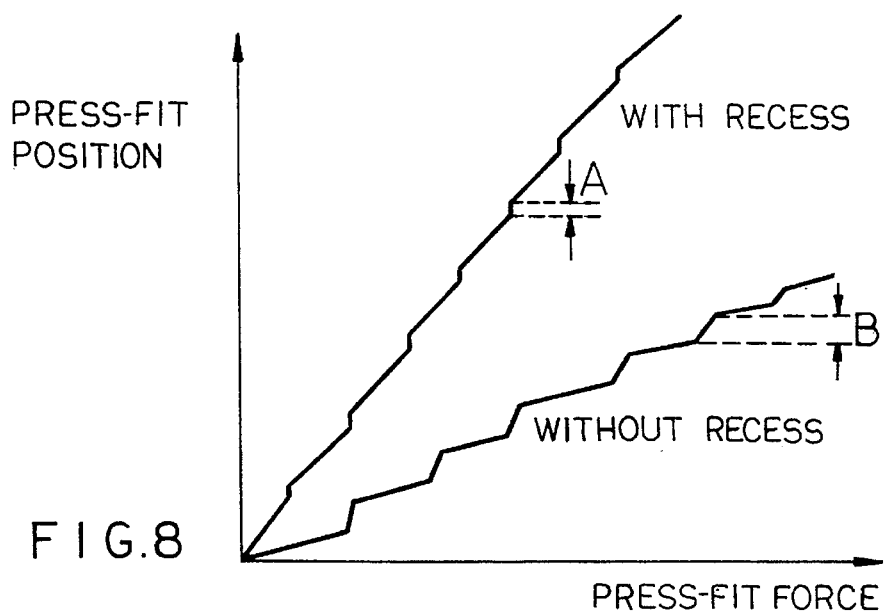
FIG. 8 is a graph plotting the relationships between the press-fit position and the press-fitting force with and without a press-fit hole.

Generally speaking, the movement of the press-fit object is accompanied by the stick slip, as shown in FIG. 8, and is thought to be stepwise caused by the press-fitting force and the press-fitting friction. Here, in order to enhance the accuracy of the press-fit position, as described above, it is important to reduce the press-fitting pressure, which has different optimum values for the materials (i.e., moduli of elasticity) of the frame 10. In the metal die-casting, generally speaking, it is recommended that the press-fitting allowance be within 0 to 20 μm. In the engineering plastics (for a reinforced grade), on the other hand, it is recommended that the press-fitting allowance be within 5 to 50 μm.

Thus, the light source 46 is press-fit in the press-fit hole 10a so that its depth (or position) can be freely set in the press-fit hole 10a. This press-fitting makes it possible to adjust the zero-cross point of the focus detecting characteristics into alignment with the focal plane of the disk. Moreover, this adjusting method can be accomplished in a far shorter time period because of its having less movement of the beam on the face of the light receiving element than that of the adjustment in which the condenser lens and/or the element are moved. In the absence of any backlash, moreover, the adjustment can be achieved with extremely high accuracy. Still further, a high reliability can be realized because no other element is moved after the adjustment. In addition, since what is required is to press-fit the light source 46 in the press-fit hole 10a, the construction can be extremely simplified to reduce the size and the cost for the optical pickup device.

Generally speaking, the preferred press-fit pressure range is between 10 newtons and 150 newtons. If the press-fit pressure is too low, it is necessary to use an adhesive to properly retain the light source 46. Typically, when the press-fit force is less than 50 newtons, an adhesive is used.

Figure 6A:
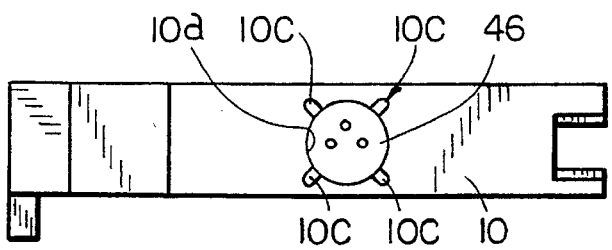
FIGS. 6(a) and 6(b) illustrate an enlarged sectional front elevation showing an essential portion of an optical pickup device according to another embodiment of the present invention.
Figure 6B:
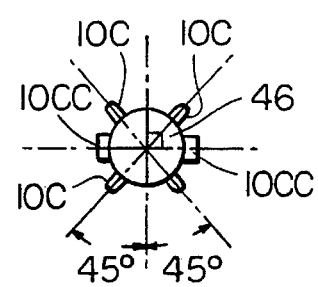

In order to enhance the press-fitting accuracy, as described above, it is important to set the press-fitting allowance properly for the material (or its modulus of elasticity) of the frame 10. The following shapes can be taken if the press-fitting allowance cannot be sufficiently managed due to the restrictions upon the design and the working tolerances of the parts. First of all, a plurality of recessed grooves or recesses 10c are cut around the press-fit hole 10a in which the light source is press-fit, as shown in FIG. 6(a). The relation between the press-fitting force and the press-fit depth are compared between the presence and absence of the recesses 10c. In FIG. 6(b), the arrangement is shown with a further large recess 10cc.

Figure 7:
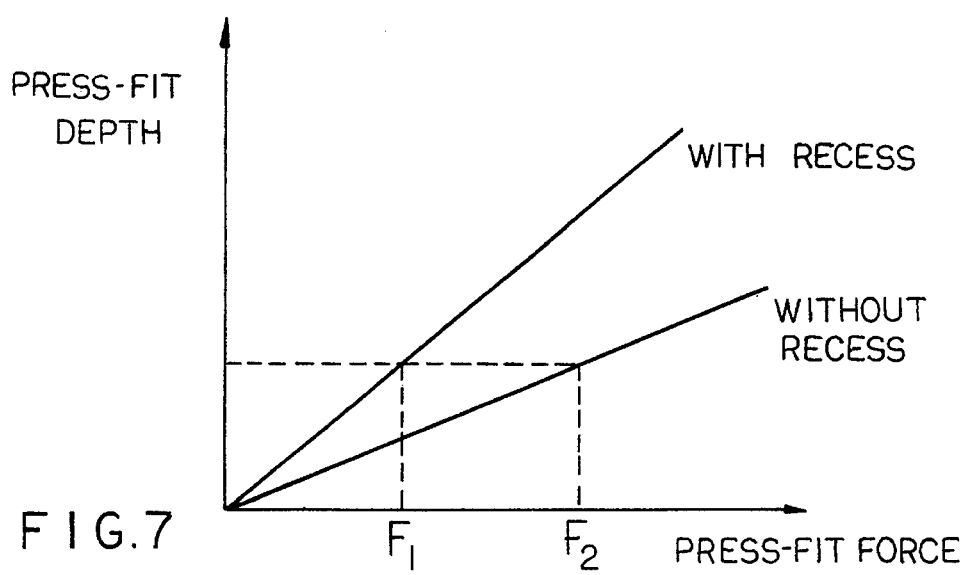
FIG. 7 is a graph plotting the relationships between the press-fit depth and the press-fitting force with and without a press-fit hole.

As shown in FIG. 7, the larger press-fit depth can be achieved by the lower press-fitting force when the recesses 10c or 10cc are formed. Moreover, the adjusting errors of the light source 46 are compared between the cases in which the recesses 10c or 10cc are formed and not. As shown in FIG. 8, the case with the recesses 10c or 10cc has the larger change in the position for a constant press-fitting force but has the lower adjusting error, as indicated at letter A. On the contrary, the case without the recesses 10c or 10cc has the smaller change in the position for a constant pressure but has a considerably large adjusting error, as indicated at letter B. By forming the recesses 10c around the press-fit hole 10a, as described above, the press-fit depth of the light source 46 can be increased while suppressing the adjusting error to a low value, for a constant press-fitting force. In addition to achieving effects similar to those of the foregoing embodiment, the light source 46 can be more accurately adjusted in its depth (or position) within the press-fit hole 10a.

Figure 9:
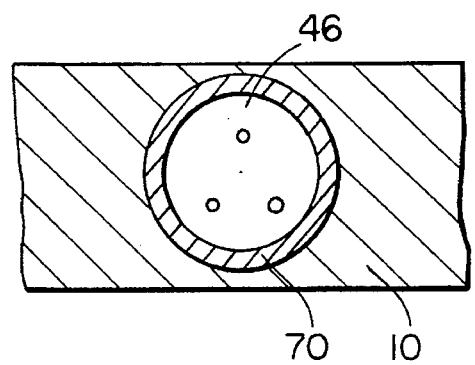
FIG. 9 is an enlarged sectional front elevation showing an essential portion according to another embodiment of the optical pickup device of the present invention.
Figure 10:
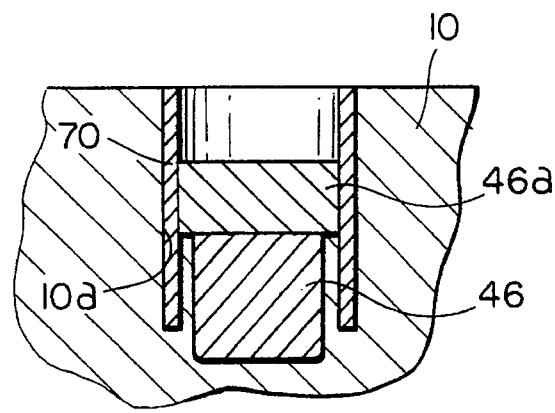
FIG. 10 is an enlarged sectional side elevation showing an essential portion of the embodiment illustrated in FIG. 9.

As shown in FIGS. 9 and 10, on the other hand, the construction may be modified such that a relatively large gap is established between the light source 46 and the inner face of the press-fit hole 10a and filled up with a material 70 of low elasticity. Because of this low elasticity material 70, the press-fitting force of the light source 46 upon the press-fit hole 10a can be reduced to provide effects similar to those of the foregoing embodiment.

FIG. 12(a) shows an optical pickup device according to the present invention and FIG. 12(b) shows a power supply flexible board 130. The optical pickup device of this embodiment is constructed by combining an optical element block 100, which is composed of the light source 46, the optical element 50, the objective lens 16 and the light receiving element 56, with a mounting portion 110 for mounting the former on the device body and a stationary cover 120. This optical element block 100 is formed with an opening 101 for inserting the half mirror 50. Further formed are portions 102 and 103 for mounting the flexible substrate 130. Incidentally, in the shown embodiment, the mounting portions 102 and 103 are exemplified by projections, and corresponding mounting portions 132 and 133 of the flexible board 130 are exemplified by holes. Alternatively, the mounting portions 102 and 103 may be exemplified by holes whereas the mounting portions 132 and 133 may be exemplified by projections.

On the other hand, the flexible board 130 is provided for supplying the electric power to the light source packaged in the aforementioned optical element block 100 and the light receiving element 56 and is equipped with a power supply portion 131 for the light source 46 and a power supply portion 134 for the light receiving element 56. The power supply portion 131 is formed with terminal holes 131a to be connected with the later-described power supply terminals (as designated at 46c in FIG. 4) of the light source. The flexible board 130 is further formed with the mounting portions 132 and 133 for the optical element block 100. Moreover, the flexible board 130 is shaped so as to cover the aforementioned opening 101 when it is mounted on the following optical element block 100.

FIG. 13 shows the state in which the flexible board 130 is mounted on the optical element block 100. In this mounting operation, the mounting portions 132 and 133 of the flexible board 130 are respectively fitted in the mounting portions 102 and 103 of the optical element block 100, and the terminal holes 131a of the power supply portion 131 are connected to the power supply terminals (46c) of the light source. Although not shown, the power supply portion 14 is connected to the terminals of the light receiving element 56. In this mounted state, the optical element block 100 has its opening 101 covered with the flexible board 130.

Figure 14:
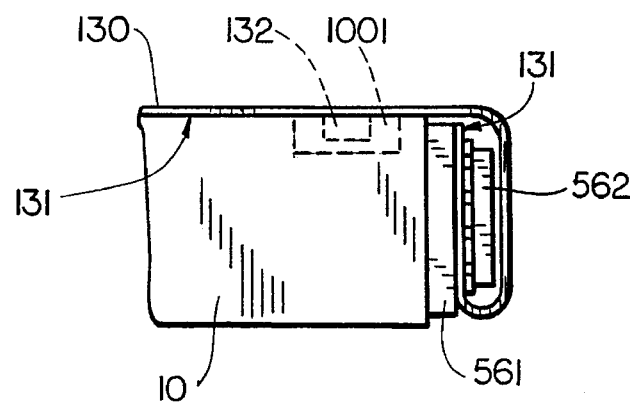
FIG. 14 is an enlarged top plan view showing an optical detector which is mounted on a detector board of the frame of the optical pickup device.

As shown in FIG. 14, an optical detector 562 is mounted on a detector board 561 of the frame 10, which is connected to the flexible circuit board 130. More specifically, the flexible circuit board 103 has its one end portion fixed on the detector board 561, and the optical detector 562 is connected to the pattern face (or mounting face) 131 formed on one side of the flexible circuit board 130. In short, the optical detector 562 is mounted on the detector board 561 so that the pattern face 131 is disposed outside of the frame 10.

The other end of the flexible circuit board 130 is folded back so that it is led out to below the detector board 561 and is folded at about 180 degrees. The other end of the flexible circuit board 130 is then led upward along the back of the optical detector 562 and is folded at about 90 degrees toward the upper face of the frame 10 to extend therealong. Then, the pattern face 131 of the flexible circuit board 130 is adhered and fixed to that upper face.

On the other hand, the frame 10 is formed in its aforementioned face with a recess 1001. In this recess 1001, there are fitted and buried the parts or elements 132 (e.g., a bypass capacitor for supplying the power to the detector), which are packaged in the pattern face of the flexible circuit board 130.

Thus, the parts or elements packaged in the flexible circuit board 130 are buried in the recess 1001 formed in the frame 10, so that their height or thickness can be reduced to make the optical pickup device accordingly thinner.

Figure 15:
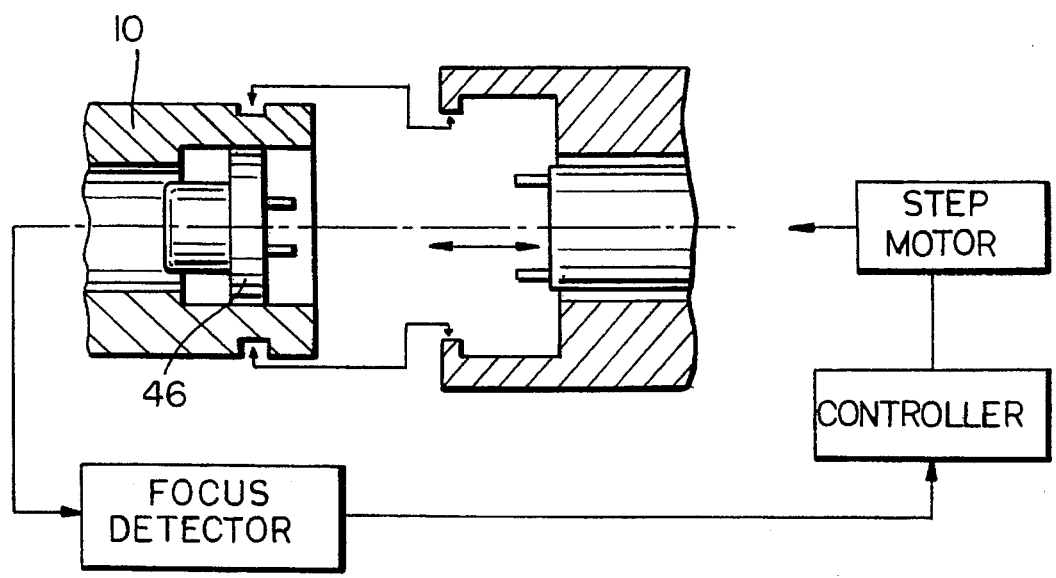
FIG. 15 is a partially schematic representation showing the applicable control loop involving the focus detector.

In FIG. 15, the relationship of light source 46 is shown in frame 10. The beam of the light source 46 forms an input characteristic for the following focus detector. The output of the focus detector is fed to a controller which, in turn, controls a step motor. The step motor controls motion of a follow-up jig which adjusts the physical relationships with respect to the frame.

According to the present invention, the frame having the optical elements fixed therein is formed with the press-fit hole in which the light source is press-fit and fixed in a manner to adjust the press-fit depth, and the zero-cross point of the focus detecting characteristics and the focal plane of the disk are aligned by adjusting the press-fit depth of the light force, so that the motion of the beam on the face of the light receiving element at the adjusting time can be reduced to shorten the adjusting time period and so that the backlash can be eliminated to improve the adjusting accuracy. After the adjustment, other elements are not moved so that a high reliability can be achieved. Moreover, the adjusting mechanism itself has a simple construction so that the number of parts can be reduced in order to reduce both the cost and the size of the device.

While the foregoing description and drawings represent the preferred embodiments of the present invention, it will be obvious to those skilled in the art that various changes and modifications may be made therein without departing from the true spirit and scope of the present invention.

What is claimed is:

1. In an optical pickup device for irradiating a disk with an optical beam from a light source by an objective lens and for detecting the beam reflected from said disk by a light receiving element, the improvement comprising:

a frame having an optical element fixed therein, said frame being formed with a press-fit hole into which said light source is press-fit and fixed to a selected press-fit depth for adjusting alignment between the optical pickup device and the disk.

2. An optical pickup device according to claim 1, wherein said press-fit hole is formed with a plurality of recesses.

3. An optical pickup device according to claim 1, wherein said press-fit hole has a material of low elasticity fitted therein.

4. An optical pickup device for irradiating a disk with an optical beam from a laser light source by an objective lens and for detecting the beam reflecting from said disk by a light receiving element, comprising:

a frame having said laser light source fixed therein, an optical element for reflecting or transmitting the laser beam of said laser light source, and said light receiving element for receiving the beam of said laser light source reflected from said disk;

said frame having a press-fit hole formed therein for fixing said laser light source; and a stepped portion being formed in said press-fit hole;

wherein said laser light source is fixed in said press-fit hole within a range in which it is out of abutment with said stepped portion.

5. An optical pickup device according to claim 4, wherein said light source is constructed to have a flanged portion 46a which has its external size set relative to the external diameter of said press-fit hole so that the press-fitting force is reduced.

6. An optical pickup device according to claim 5, wherein said frame is made of a plastic material, and wherein said frame being formed with said press-fit hole is formed with a plurality of recesses 10c for lowering said press-fitting force.

7. An optical pickup device comprising:

support means for supporting an objective lens holder holding an objective lens, rotatably and axially movable; and a frame made of a plastic material for holding said support means and for fixing a laser light source, an optical element for reflecting or transmitting a laser beam of said laser light source, and a light receiving element for receiving the reflected beam of said laser beam from a disk through an objective lens and said optical element;

said light source being constructed so to have a flanged portion;

said frame being formed with a press-fit hole for fixing said laser light source; and said press-fit hole being formed with a plurality of recesses for lowering a press-fitting force.

8. An optical pickup device according to claim 7, wherein said recesses are formed symmetrically about the center of said light source.

* * * * *